March 2, 1937.  C. J. GRAVES ET AL  2,072,553
SPECIFIC GRAVITY INDICATOR
Filed July 9, 1934
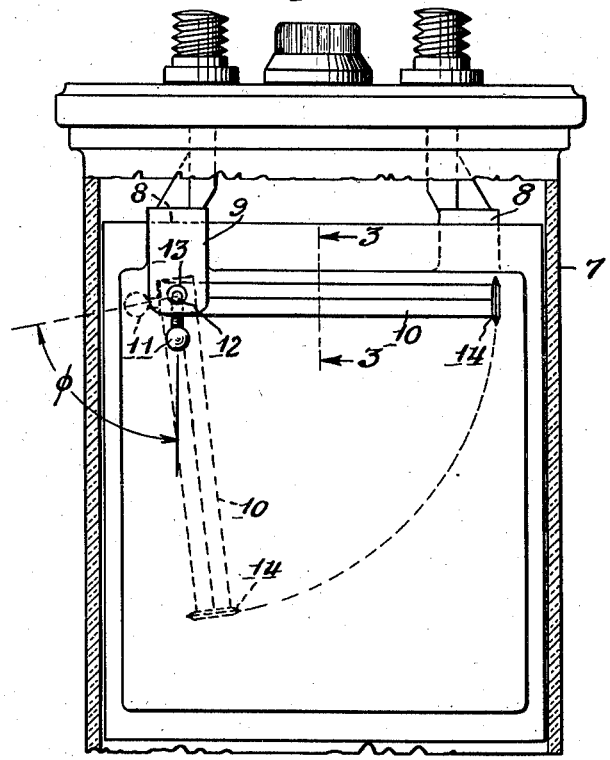
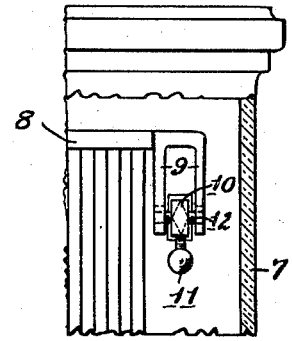
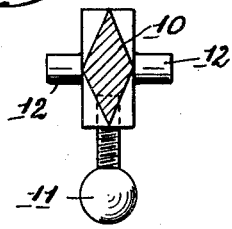
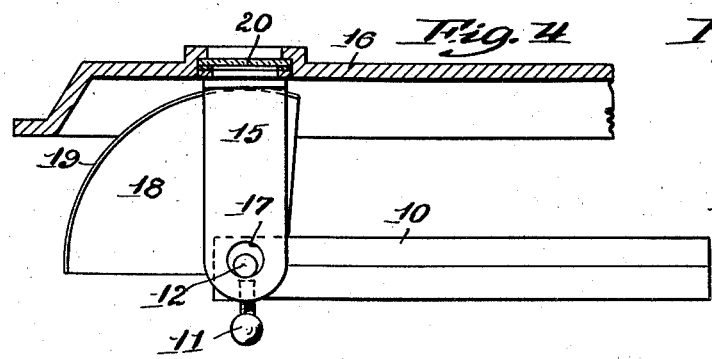
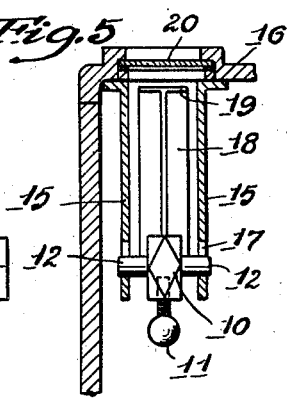
Inventors
Clarence J. Graves
John L. Rupp
Edgar W. Breisch
By Stryker & Stryker
Attorneys Patented Mar. 2, 1937

2,072,553

UNITED STATES PATENT OFFICE 2,072,553

SPECIFIC GRAVITY INDICATOR

Clarence J. Graves, John L. Rupp, and Edgar W. Breisch, Lancaster, N. Y., assignors to Gould Storage Battery Corporation, St. Paul, Minn., a corporation of Delaware Application July 9, 1934, Serial No. 734,422

3 Claims. (Cl. 265—45)

This invention relates to a specific gravity indicator particularly, although not exclusively, adapted for use in connection with storage batteries to give a visual indication of the state of charge or discharge of the battery.

It is an object of our invention to provide a novel device of this kind adapted to give more accurate and a larger range of indications of the specific gravity changes in an electrolyte or other liquid subject to such changes.

A particular object is to provide a device of this kind adapted to give visual indications of a large range of specific gravity values and having the characteristic of greatest sensitivity as the specific gravity approaches a predetermined maximum.

A further object is to increase the accuracy of a device of this kind by a novel form of float to which the gas bubbles present in storage batteries can not adhere to a substantial or detrimental extent.

Another object is to provide a specific gravity indicator particularly adapted for use in batteries and the like having transparent jars or containers wherein the device is so arranged as to give a visual indication of the charge of the battery through either a side or an end wall of the container.

Other objects will appear and be more fully pointed out in the following specification and claims.

In the accompanying drawing,

Figure 1 is a side elevation of one form of our improved specific gravity indicator, mounted on a battery of the type having a transparent jar, with portions of the jar broken away;

Fig. 2 is an end view of the device as seen from the left of Fig. 1, together with a fragmentary portion of the battery;

Fig. 3 is an enlarged section taken on the line 3—3 of Fig. 1, showing the float and counterpoise removed from the support;

Fig. 4 is a side elevation of an alternate form of the device adapted for use in batteries having non-transparent jars, and Fig. 5 is a fragmentary section through the bearing support and a portion of the battery container and showing the float and segment of the alternate form in end view.

In Figs. 1 and 2, a transparent jar or container of a battery is indicated by the numeral 7. This jar contains the electrolyte and positive and negative plates with separators between them and has at the top of the battery the usual terminals and filling plug. The terminals or binding posts project from cross bars 8 connecting the plates of opposite polarity in separate groups. Secured to an end of one of the cross bars 8 is a small bracket having parallel bearing members 9 depending into the electrolyte to support the specific gravity indicator. The indicator comprises a float arm 10 pivotally supported near one end between the bearing members 9 and a counterpoise 11 projecting from a side of the arm 10 for the purpose hereinafter described. Studs 12 project horizontally from opposite sides of the arm 10 to rock in bearings comprising relatively large perforations 13 in the bearing members 9. Fixed on the free end of the arm 10 is a target 14 which is preferably so colored that it is readily visible and distinguishable from other mechanism in the jar. The float arm 10 is preferably constructed from hard rubber or other suitable material of such composition and density that it will float in the particular electrolyte employed in the battery when the latter is fully charged and will sink in the electrolyte when the battery is in discharged or partially discharged condition. The counterpoise 13 is of relatively much smaller size and constructed from relatively dense material, such as lead. We prefer to so place the counterpoise that it projects radially from the pivotal axis of the arm 10 at an angle of 90 degrees from the longitudinal axis of the arm 10. The counterpoise 11 may be provided with a screw-threaded connection with the arm 10 so that the effective length of the lever arm carrying the counterpoise may be adjusted.

It will be evident that the arm 10 swings in a vertical plane about the axis of the studs 12 and, in the absence of the counterpoise 11, would drop to substantially vertical position immediately upon the discharge of the battery to a point where the specific gravity of the electrolyte is insufficient to support the arm 10 in its elevated position. By our arrangement of the counterpoise 11, however, the arm 10 is caused to come to rest at a definite, intermediate position for each specific gravity value between the fully charged and fully discharged conditions of the battery. This follows from our arrangement of the counterpoise 11 on a lever arm, the effective length of which is dependent on the angular position of the float arm. When the counterpoise is in its dotted line position shown in Fig. 1 the angle of departure $\phi$ from the vertically dependent or full line position is such that the counterpoise has approximately its maximum restraining effect on the float arm and the effect diminishes from such a point to zero as the float and counterpoise approach the fully charged or full line position shown in the drawing. Thus the counterpoise has a restraining effect on arcuate movements of the arm 10 which is proportional to the weight of the former multiplied by the effective lever arm and as the effective lever arm varies as the sine of the angle of departure of the counterpoise from its vertically pendant position, it may be said that our indicator has a sine calibration. This is a particularly desirable characteristic as it results in the greatest sensitivity as the battery approaches a charged state.

The gas bubbles which are formed in batteries have a tendency to adhere to objects immersed in the electrolyte and in order to minimize the adherence of such bubbles to the float arm 10, we construct it with a cross sectional shape like that shown in Fig. 3; that is, with the horizontal dimension in cross section relatively small compared to the vertical dimension and with relatively sharp upper and lower edges and steeply inclined sides. With this construction the bubbles readily rise to the upper edge of the float and, as there is very little area along the ridge to which the bubbles can adhere, all but the most minute of them free themselves from the float. Such minute bubbles as do adhere have such slight buoyancy that they do not seriously affect the operation of the device. Our improved form of float also minimizes inaccuracies due to the deposits of sediment thereon.

By mounting the pivot studs 12 in the perforations 13 in which there is a large amount of clearance, we obtain a rolling action in the bearing rather than the usual sliding contact at the entire periphery. This reduces friction and avoids the difficulties attendant upon the use of a close fitting bearing under the conditions existing in a storage battery. The studs 12 do not work out of proper position in the perforations 13 either in shipment or during service.

In Figs. 4 and 5, we have shown a modification of the device suitable for use where it is employed in batteries with non-transparent jars. For such use supporting bearings 15 may be secured to the inner surface of the cover 16 of the battery and the float arm 10 may be supported in large perforations 17 formed in the bearings 15. A segment 18 of suitable light material, such as a pyroxylin composition, is rigidly attached to the arm 10 and has a flanged outer periphery 19 on which suitable legends are so placed as to be visible through a window 20 mounted in an opening in the cover 16. With this alternate form it will be evident that the target 14 may be omitted. The arm 10 swings in a vertical plane adjacent to one of the outer plates of the battery so that the state of charge of the battery is at all times evident by observation of the legends on the periphery 19 of the segment 18.

With both illustrated forms of the invention accurate indications result from the relatively large range of movement of the float arm. A calibrated outer surface on the outer plate of the battery adjacent to the float may be provided or the glass wall adjacent the float arm may be calibrated where readings of specific values are necessary or desirable, but for general service, such as house and farm lighting and the like, calibration is unnecessary and mere observation of the position of the float gives a sufficiently accurate indication of the state of charge.

Having described our invention, what we claim as new and desire to protect by Letters Patent is:

1. A device of the class described comprising, a float arm pivotally mounted on a horizontal axis in a liquid subject to specific gravity changes and in the presence of gas bubbles, said arm being constructed entirely from a material having a lower specific gravity than the maximum specific gravity of said liquid, said arm being wide vertically and relatively thin horizontally and formed with an acutely angular upper edge and being movable edgewise in the liquid from a substantially horizontal position corresponding to the maximum specific gravity value of said electrolyte to a substantially vertical, dependent position, corresponding to the discharged density of said electrolyte, and means for balancing said arm in a number of angular positions corresponding to a number of specific gravity values, said arm being responsive to smaller changes in density when the battery approaches maximum charge than when nearly discharged.

2. A specific gravity indicator comprising, a horizontally thin, acid-resistant float arm, means pivotally supporting said arm in an acid subject to specific gravity changes, said arm being movable in a substantially vertical plane therein and being constructed entirely from a material having a lower specific gravity than the maximum specific gravity of said liquid, and a counterpoise comprising a concentrated weight secured to said arm in a position to project at a right angle thereto from the pivotal axis thereof, said counterpoise being disposed to balance said arm in a multiplicity of positions corresponding to specific gravity changes in said liquid and to retain said arm in substantially horizontal position when the battery is fully charged and to allow said arm to assume a substantially vertical position when the battery is substantially discharged, whereby the indicator is rendered most sensitive to specific gravity changes when the charge approaches its maximum value.

3. A specific gravity indicator for use in a liquid container comprising, a float arm, means for pivotally supporting said arm in liquid in said container, a segment secured to said arm and having a legend arranged to be displayed horizontally from above for indicating a multiplicity of specific gravity values, means for balancing said arm in a multiplicity of positions corresponding to the specific gravity values indicated by said legend and a window formed in the top of said container to permit a view of said legend on said segment.

CLARENCE J. GRAVES.
JOHN L. RUPP.
EDGAR W. BREISCH.